(12) United States Patent
Serrat et al.

(10) Patent No.: US 11,631,219 B2
(45) Date of Patent: Apr. 18, 2023

(54) METHOD FOR GENERATING A THREE-DIMENSIONAL WORKING SURFACE OF A HUMAN BODY, SYSTEM

(71) Applicant: SQUAREMIND, Paris (FR)

(72) Inventors: Tanguy Serrat, Saint-Cloud (FR); Ali Khachlouf, Paris (FR)

(73) Assignee: SQUAREMIND, Paris (FR)

( * ) Notice: Subject to any disclaimer, the term of this patent is extended or adjusted under 35 U.S.C. 154(b) by 0 days.

(21) Appl. No.: 17/438,249

(22) PCT Filed: Mar. 19, 2020

(86) PCT No.: PCT/EP2020/057703
§ 371 (c)(1),
(2) Date: Sep. 10, 2021

(87) PCT Pub. No.: WO2020/188063
PCT Pub. Date: Sep. 24, 2020

(65) Prior Publication Data
US 2022/0101602 A1 Mar. 31, 2022

(30) Foreign Application Priority Data
Mar. 21, 2019 (FR) ...................................... 1902939

(51) Int. Cl.
*G06T 17/20* (2006.01)
*G06T 7/50* (2017.01)
(Continued)

(52) U.S. Cl.
CPC ............ *G06T 17/20* (2013.01); *G06K 9/6256* (2013.01); *G06T 3/60* (2013.01); *G06T 7/40* (2013.01);
(Continued)

(58) Field of Classification Search
CPC ... G06T 7/50; G06T 2207/10028; G06T 7/60; G06T 7/75; G06T 17/20; G06T 19/20;
(Continued)

(56) References Cited

U.S. PATENT DOCUMENTS

| | | | | |
|---|---|---|---|---|
| 2010/0111370 A1* | 5/2010 | Black | ................... | G06V 10/763 705/26.1 |
| 2011/0273442 A1* | 11/2011 | Drost | ................... | G06V 10/757 345/419 |
| 2021/0012558 A1* | 1/2021 | Li | ........................... | G06T 19/20 |

FOREIGN PATENT DOCUMENTS

KR 20040081255 A * 9/2004
WO WO-2020141468 A1 * 7/2020

OTHER PUBLICATIONS

Bronstein, Michael M., and Iasonas Kokkinos. "Scale-invariant heat kernel signatures for non-rigid shape recognition." 2010 IEEE computer society conference on computer vision and pattern recognition. IEEE (Year: 2010).*

(Continued)

*Primary Examiner* — Diane M Wills
(74) *Attorney, Agent, or Firm* — Pillsbury Winthrop Shaw Pittman LLP

(57) ABSTRACT

A method for generating a three-dimensional working surface of a human body includes receiving input data corresponding to images; generating a first point cloud from the input data, each point being associated with a three-dimensional spatial coordinate; determining a plurality of attributes at each point of the first point cloud, calculating a set of geometric parameters from a regression carried out from a series of matrix operations performed according to different layers of a neural network trained from a plurality of partial views of parametric models parameterised with dif-
(Continued)

Figure 1:
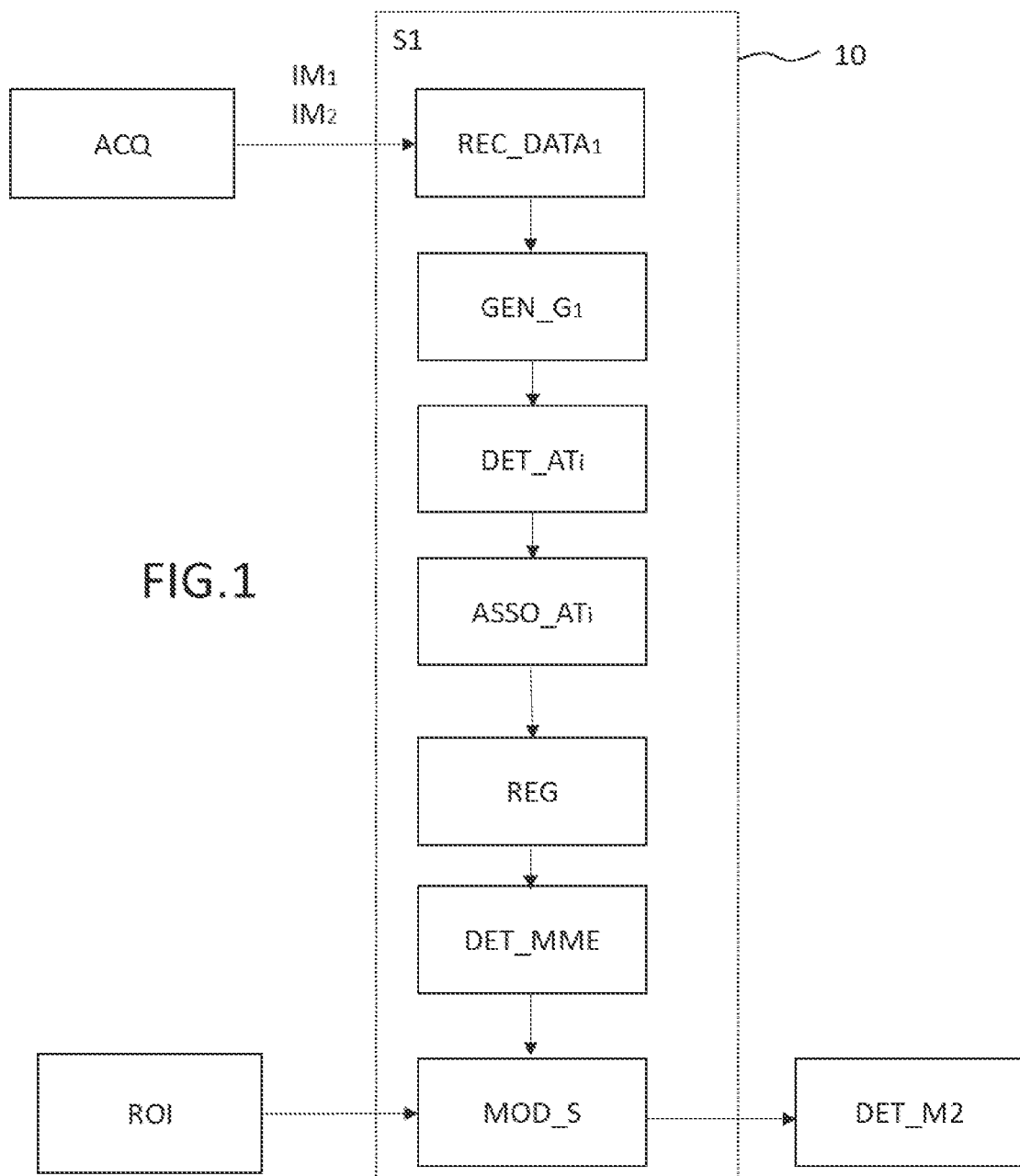

ferent parameterisation configurations; determining a parameterised model to generate a body model of a body including a first meshing.

16 Claims, 6 Drawing Sheets

(51) Int. Cl.
*G06T 7/73* (2017.01)
*G06T 7/60* (2017.01)
*G06T 19/20* (2011.01)
*G06V 10/82* (2022.01)
*G06V 10/46* (2022.01)
*G06V 10/766* (2022.01)
*G06K 9/62* (2022.01)
*G06T 3/60* (2006.01)
*G06T 7/40* (2017.01)

(52) U.S. Cl.
CPC .................. *G06T 7/50* (2017.01); *G06T 7/60* (2013.01); *G06T 7/75* (2017.01); *G06T 19/20* (2013.01); *G06V 10/46* (2022.01); *G06V 10/766* (2022.01); *G06V 10/82* (2022.01); *G06T 2200/08* (2013.01); *G06T 2207/10012* (2013.01); *G06T 2207/10028* (2013.01); *G06T 2207/10132* (2013.01); *G06T 2207/20072* (2013.01); *G06T 2207/20081* (2013.01); *G06T 2207/20084* (2013.01); *G06T 2207/30196* (2013.01); *G06T 2210/41* (2013.01); *G06T 2219/2016* (2013.01)

(58) Field of Classification Search
CPC ............. G06T 2200/08; G06T 2210/41; G06T 2219/2016; G06T 2207/20081; G06T 2207/20084; G06V 10/82; G06K 9/6256; G06N 3/02
See application file for complete search history.

(56) References Cited

OTHER PUBLICATIONS

Campbell, Richard J., and Patrick J. Flynn. "A survey of free-form object representation and recognition techniques." Computer Vision and Image Understanding 81.2 (2001): 166-210. (Year: 2001).*
Madadi M. Human segmentation, pose estimation and applications. Universitat Autonoma de Barcelona; 2017, Chapter 2, p. 11-42. (Year: 2017).*
Groueix, T., Fisher, M., Kim, V. G., Russell, B. C., & Aubry, M. (2018). 3d-coded: 3d correspondences by deep deformation. In Proceedings of the European Conference on Computer Vision (ECCV) (pp. 230-246). (Year: 2018).*
Joo, Hanbyul, Tomas Simon, and Yaser Sheikh. "Total capture: A 3d deformation model for tracking faces, hands, and bodies." Proceedings of the IEEE conference on computer vision and pattern recognition (Year: 2018).*
Wan, Chengde, Angela Yao, and Luc Van Gool. "Hand pose estimation from local surface normals." European conference on computer vision. Springer, Cham (Year: 2016).*
International Search Report as issued in International Patent Application No. PCT/EP2020/057703, dated Apr. 17, 2020.
Groueix, T., et al., "3D-CODED: 3D Correspondences by Deep Deformation," International Conference on Financial Cryptography and Data Security, [Lecture Notes in Computer Science], Oct. 2018, pp. 235-251, XP047489178.
Gadelha, M., et al., "Shape Generation using Spatially Partitioned Point Clouds," ARXIV.org, Cornell University Library, Jul. 2017, 12 pages, XP080778050.
Griffiths, D., et al., "A Review on Deep Learning Techniques for 3D Sensed Data Classification," ARXIV.org, Cornell University Library, Jul. 2019, 25 pages, XP081440096.
International Preliminary Report on Patentability and the Written Opinion of the International Searching Authority as issued in International Patent Application No. PCT/EP2020/057703, dated Sep. 16, 2021.

* cited by examiner

METHOD FOR GENERATING A THREE-DIMENSIONAL WORKING SURFACE OF A HUMAN BODY, SYSTEM

CROSS-REFERENCE TO RELATED APPLICATIONS

This application is the U.S. National Stage of PCT/EP2020/057703, filed Mar. 19, 2020, which in turn claims priority to French patent application number 1902939 filed Mar. 21, 2019. The content of these applications are incorporated herein by reference in their entireties.

The field of the invention relates to the field of methods making it possible to construct a three-dimensional image of the human body in order to dynamically enslave a device near to the body. The field of the invention more particularly pertains to methods enabling real time dynamic control necessitating rapidity of calculation of the three-dimensional surface. The invention thus pertains to methods for generating a surface from algorithms combining parameterised models and learning by an artificial intelligence technique.

Different techniques currently exist for reconstituting three-dimensional surfaces in space. However, the latter are not suited to a guiding in real time of a medical device intended to perform a treatment near to the surface of the skin of a patient. Indeed, reconstituting the surface of a body necessitates image processing, imposing important computational resources and often numerous acquisition systems. Furthermore, this complexity most often imposes a partial processing or an approximation requiring human assistance.

Today, this limitation does not make it possible to carry out complex guiding of a device in space. Typically, the guiding of a robotised object in space enslaved by a calculation of a surface to treat being able to undergo deformations or displacements remains difficult to implement. Nevertheless, there exists a need to manipulate a robotised object that is reactive and automatically guided as a function of certain analyses to perform in real time. To date, existing solutions impose additional operator manipulations or processing times that remain long.

There thus exists a need to define a solution that can respond to this problem.

The present invention aims to resolve the aforesaid drawbacks.

According to an aspect, the invention relates to a method for generating a three-dimensional working surface of a human body comprising the steps of:
Reception of input data corresponding to geometric data;
Generation of a first point cloud from the input data, each point being associated with a three-dimensional spatial coordinate;
Determination of a plurality of attributes at each point of the first point cloud, said attributes comprising at least one shape descriptor, at least one shape descriptor being calculated from a sub-set of points in the vicinity of the considered point, at least one attribute of a point comprising data describing a normal vector at this point of the first point cloud,
Association of said attributes with each point to generate a second enriched point cloud;
Calculation of a set of geometric parameters comprising at least one rotation at at least one point of the second point cloud or at at least one articulation of a human body model and at least one shape coefficient by means of a regression, said regression being carried out from a series of matrix operations performed according to different layers of a neural network trained from a plurality of partial views of parametric models parameterised with different parameterisation configurations;
Determination of a parameterised model to generate a body model of a body comprising a first meshing.

According to an example the input data comprise data describing images. The geometric data may for example be deduced from data describing 2D images. According to one case, the input data are thus images.

According to an aspect, the invention relates to a method for generating a three-dimensional working surface of a human body comprising the steps of:
Reception of input data corresponding to geometric data;
Generation of a first point cloud from the input data, each point being associated with a three-dimensional spatial coordinate;
Determination of a plurality of attributes at each point of the first point cloud, said attributes comprising at least one shape descriptor, at least one shape descriptor being calculated from a sub-set of points in the vicinity of the considered point,
Association of said attributes with each point to generate a second enriched point cloud;
Calculation of a set of geometric parameters comprising at least one rotation at at least one point of the second point cloud or at at least one articulation of a human body model and at least one shape coefficient by means of a regression, said regression being carried out from a series of matrix operations performed according to different layers of a neural network trained from a plurality of partial views of parametric models parameterised with different parameterisation configurations;
Determination of a parameterised model to generate a body model of a body comprising a first meshing.

Indeed, according to an embodiment, a normal vector may be considered as a particular shape descriptor. The invention may thus apply to any shape descriptor used to construct a finite dimension vector at each point of the meshing or in a selection of points of the meshing. Here the finite dimension vector is a container of attributes at a point, it is different from the normal vector. This finite dimension vector may be considered as a mathematical tool to gather together attributes rather than a vector having a geometric direction in Euclidean space. The finite dimension vector may comprise attributes of which certain shape descriptors of which notably a normal vector when the latter is calculated at each point of the graph.

An advantage of the method is to enable an enslavement in real time of the guiding of a medical equipment near to a body of a patient with a minimalist acquisition system comprising for example a pair of cameras. The guiding performances are notably obtained thanks to a learning method of a high-performance neural network.

According to an embodiment, the method comprises, further, a processing of the first meshing to generate a second homogeneous meshing. An advantage of the use of a homogeneous meshing is to facilitate the enslavement commands of the sensor or sensors or the transmitter or transmitters at the head of the robot arm. Indeed, the processing of a point of a homogeneous meshing makes it possible to facilitate the exploitation of the device at the head of the robot arm.

According to an embodiment, a shape descriptor is calculated at at least one given point of the first point cloud from the adjacency matrix of the first graph by means of a method for spectral partitioning of the first point cloud. An advantage is to take into account in the vicinity of a point a shape descriptor that is weighted according to a distance criterion at the point where it is applied. Another advantage is to make it possible to take into account the topology of the local surface in the vicinity of a point.

According to an embodiment, at least one local shape descriptor and/or global shape descriptor is of the type: "Wave Kernel Signature" or "Heat Kernel Signature" or "Gaussian Curvature". An advantage is to define shape descriptors from a spectral analysis of the region in the vicinity of a point. An advantage is the simplified use of equations or normalised operators of which the digital processing may be optimised.

According to an embodiment, the calculation of a normal vector at a given point of the first point cloud is calculated by considering a surface generated locally around each considered point from points in its vicinity. An advantage is to parameterise a desired resolution or a granularity for analysing the topology of the local surface of the surface of the treated body.

According to an embodiment, the surface generated locally at a considered point of the first point cloud is calculated:
  Either, from the underlying surface defined by the points of the first point cloud;
  Or, from an approximation of a local surface directly obtained from a method of the k closest neighbours of the considered point.

According to an embodiment, at least two shape descriptors are associated with each point of the first point cloud. An advantage is to enrich the description of the model. An interest is to obtain better learning during the training of the neural network. Further, an advantage is to improve the performances of the step of regression of the neural network.

According to an embodiment, the first point cloud is generated from data obtained:
  By the acquisition of a plurality of images from at least two optics, each position of a point of the first point cloud being deduced from a stereoscopic measurement of at least two acquired images and/or;
  By the acquisition of an image comprising a deformed pattern, said pattern being projected by a projector and comprising a known geometry and/or;
  By the acquisition of ultrasonic signals transmitted and reflected on the surface of the skin of a patient and/or;
  By the acquisition of a laser transmitted on the surface of the skin of a patient.

An advantage is to implement the method of the invention with different acquisition techniques. An interest is to obtain a point cloud being able to be exploited by the method of the invention, notably for the guiding of a medical apparatus. The different acquisition techniques may be combined or replaced one by the other. The image acquisition system, such as cameras, remains nevertheless an acquisition system that is simple to implement, simple to configure and easily deployable.

According to an embodiment, the parameterised body models are obtained from a parametric modelling of the human body in which a set of articulations are predefined, said parameters modelling:
  at least one angle of rotation for at least one articulation and;
  at least one shape coefficient.

An advantage is to define a simple parameterisation of a human body taking into account the different degrees of freedom of each limb of the body. An advantage is to carry out a real time enslavement of a device guided as a function of the possible movements of a patient.

According to an embodiment, said parameters model, further:
  at least one global translation of the model in space, and/or;
  at least one global rotation of the model in space.

An advantage is to make it possible to take into account displacements of a patient and to calibrate the acquisition system of the body of a patient as a function of the arrangement of the different items of equipment.

According to an embodiment, a parameterised body model is obtained from a definition of a given parameterisation, a given parameterisation comprising the definition of a set of modelling parameters making it possible to define a given representation of the parametric body model. Said parameterised body model may next be represented by a third point cloud, a graph or a meshing. An advantage is to generate a point cloud directly exploitable from the parameterised bodies obtained. Another advantage is to obtain a large quantity of bodies according to different poses in order to obtain good performance for generalisation of the neural network.

According to an embodiment, a plurality of partial views is generated. Each of the partial views may for example be obtained from a sub-set of points of the third point cloud. An advantage is to generate numerous views capable of corresponding to real image captures. The neural network is thus better trained and the performances of the regression step are better with learning on a large number of partial views.

According to an embodiment, each sub-set of points of the third point cloud is obtained by a selection of points seen from a given viewpoint of space, the set of partial views being generated for a plurality of viewpoints of space.

According to an embodiment, the regression comprises:
  Neural network convolutions or layers comprising a plurality of multiplications of matrices comprising weighting coefficients obtained from a learning method;
  non-linear operations.

According to an embodiment, the regression comprises as input:
  points of the point cloud and the value of their attributes and/or;
  the adjacency matrix of the graph corresponding to a point cloud.

According to an embodiment, the method comprises a preliminary step of learning of the neural network, said preliminary step being carried out by a deep learning method comprising:
  a training carried out from a plurality of partial views of parametric models parameterised with different parameterisation configurations,
  the production of matrices comprising weighting coefficients for each layer of the trained network.

According to another aspect, the invention relates to a system comprising an interface for acquiring input data, a calculator and a memory for processing input data acquired by means of the method to generate a parameterised body model.

According to an embodiment, the invention relates to a system comprising a means for acquiring distance data of a set of points of a surface of a body situated in space, a guided robot arm comprising at least one degree of freedom, said robot arm further comprising a sensor or a transmitter of which the position is enslaved by a guiding trajectory obtained from a treatment trajectory defined at the surface of a partial view of a body model, said body model being generated from the method of the invention.

The system of the invention may be configured according to the different parameters listed to describe the method of the invention. Further, the system of the invention comprises according to the different embodiments the different means described in the different embodiments of the method of the invention.

According to another aspect, the invention relates to a method for guiding in real time a robot arm for the processing of data of the surface of a body comprising the steps of:
  Generation of a model of a body comprising a meshing of points;
  Planning of a treatment trajectory on the surface of the body model by means of a calculator; parameters of sensors
  Calculation of a guiding trajectory of the distal end of the robot arm;
  Generation of a kinematic of the robot arm such that a point of the head arranged at the distal end of the robot arm is enslaved on the guiding trajectory;
  Activation of the kinematic of the robot arm to cover the guiding trajectory, said trajectory being calculated in real time from the generated body model;
  Reception of at least one position of a target point of space;
  Activation of at least one transmission of a transmitter and/or an acquisition of a sensor of an operator device, said operator device being arranged at the distal end of the robotised arm, the activation being carried out when the orientation of the axis of the sensor or the transmitter is merged with a predefined straight line passing through the target point, said target point being referenced on the generated body model.

An advantage is to use a guiding method which takes into consideration a body model reproducing the body of a patient. The calculations are lightened and the enslavement in real time of a medical equipment is made possible. The reconstitution of a real world is optimised by the use of a meshed body model which is calculated from a body of a patient. An advantage is to take into account potential movements of a patient or to anticipate potential collisions by using a body model that is simple to exploit. The body model used comprises a set of points or a meshing that may be easier to exploit for real time guiding rather than a system based on the acquisition of direct images of a patient to anticipate the movements of the robot.

According to an embodiment, the body model is generated from a system for acquiring images of the body of a patient, said system being arranged at a point of space. An advantage is that the acquisition of a partial view of the human body makes it possible to generate an entire human body from an algorithm based on the exploitation of a neural network.

According to an embodiment, the treatment trajectory is generated within a zone for treating a surface of the body model.

An advantage is to define a guiding trajectory that is generated vis-à-vis the generated surface of the body model used as input. The guiding is thus optimised due to the simplified exploitation of a meshed body model.

According to an embodiment, the treatment trajectory is automatically generated from the definition of a treatment zone defined on a surface of the body model.

An advantage is to automate a task for an operator who only has to select a region. The region is defined on the body model that is generated. Thus, its definition is simplified and the trajectory may be generated easily.

According to an embodiment, the guiding trajectory is calculated from a predefined distance and orientation instruction making it possible to generate a relative position of a distal end of the robot arm vis-à-vis the treatment trajectory.

An advantage is to obtain a simplified guiding by an enslavement system taking into consideration a minimum of parameters.

According to an embodiment, the robot arm comprises at least 3 branches articulated two by two, one with respect to the other via a pivot link, the set of pivot links comprising a planned kinematic for a given guiding trajectory and a generated body model.

An advantage is to dissociate the generation of the kinematic of the robot arm which may be carried out within a calculator of the robotised arm as a function of a position of a guiding point of the trajectory generated from an operating console.

According to an embodiment, the guiding method comprises the generation of a new body model at regular times such that the robot arm can be commanded in real time from the generation of a new trajectory of the robot arm, a new surface calculated from the body model leading to a modification of the treatment trajectory, the method comprising, further, a calculation of a new kinematic of the robot arm enslaved on the definition of the new trajectory. An advantage is to obtain good guiding performances in real time. The taking into account of a body model simplifies the guiding calculations. The enslavement of the robot arm may be rapid and thus makes it possible to limit cases of collisions or sudden movements of a patient.

According to an embodiment, the guiding method comprises a step of calibration of the position of the robot arm from a fixed position at which are acquired images making it possible to generate a body model. An advantage of the calibration is to know the position of the body model with respect to the position of the end of the robot arm.

According to an embodiment, the treatment trajectory is used to establish a shot strategy of a laser beam from a laser transmitter, said laser transmitter being fixed to the operator device.

According to an embodiment, the body model comprises a homogeneous meshing so as to create a new meshing defined by an arrangement of circles, at least one circle defining the position of a target point of space. An advantage is to simplify the activation of an operator device at the head of the robot arm as a function of points being able to be easily pinpointed on a meshing.

According to an embodiment, the new meshing is generated as a function of a shot power instruction and/or an instruction relative to an amount of overlap between two shots. An advantage is to have available a meshing adapted to the case of use of the robotised arm.

According to an embodiment, the sampling of the number of shots carried out is a function of the new meshing, the configured shot power and the amount of overlap defined between two colocalised circles. An advantage is to provide to an operator a simple to use operating console.

According to an embodiment, the treatment trajectory is used to establish a shot strategy of an ultrasonic signal from an ultrasonic transmitter, said ultrasonic transmitter being fixed to the operator device.

According to an embodiment, a set of images is produced from an optical device arranged on the operator device, each image being indexed with at least one node or mesh of the meshing of the body model as a function of the position of the target point on said body model and viewing angle of the optical device. An advantage is to reconstitute an outer layer such as skin on the parameterised or parametric body model corresponding to the body of a patient.

According to an embodiment, at least one pair of images is acquired simultaneously from an optical device comprising two sensors that are integral and arranged on different axes of the operator device, each image being indexed with at least one node or mesh of the meshing of the body model as a function of the position of the target point on said body model and viewing angle of the optical device, said images being processed so as to reconstitute a three-dimensional local image.

According to an embodiment, the three-dimensional local image is superimposed in a 3D representation on a generated body model.

According to an embodiment, a first image acquired by a first optical device of the operator device is compared with a set of images in real time, the comparison operation comprising, if appropriate, the generation of an indicator of interest, said indicator of interest making it possible to generate a digital command to manage the robot arm.

According to an embodiment, the guiding instruction leads to a first management of the robot arm at the target position from where is extracted the first image and a second management of the operator device to activate a second optical device, the activation of the second optical device making it possible to produce a second image in near field of a zone comprising the target point. An advantage is to generate a bank of images being able to be used notably for diagnostic purposes, the qualitative study of patients and illnesses or instead to generate a history of images for a patient comprising information on the skin covering at different scales.

According to an embodiment, the comparison step is a step of classification of said image acquired from a neural network trained on a set of images. An advantage is to optimise the step of detection of a singularity on the skin covering of a patient.

According to another aspect, the invention relates to a system for guiding a robot arm comprising:
- a calculator to generate a plurality of body models at different times;
- a robot arm enslaved by a calculator of a control unit calculating a kinematic of the robot arm from a trajectory calculated from points defined on a meshing of an acquired body model;
- an operator device arranged at the end of the robot arm comprising at least one transmitter or sensor, the activation of the at least one transmitter or sensor being carried out when the orientation of the axis of the sensor or transmitter is directed along a straight line passing through the target point, said target point being referenced on the generated body model.

According to an aspect, the invention relates to system for guiding a robot arm comprising a device for acquiring an image of a body of a patient to produce a parameterised body model and a robot arm provided with an operator device for the implementation of the method of the invention.

The system of the invention comprises, according to different alternative embodiments, the different means described in the different embodiments of the invention. Further, according to the different alternatives, it is configured according to the different embodiments of the method of the invention.

Figure 2:
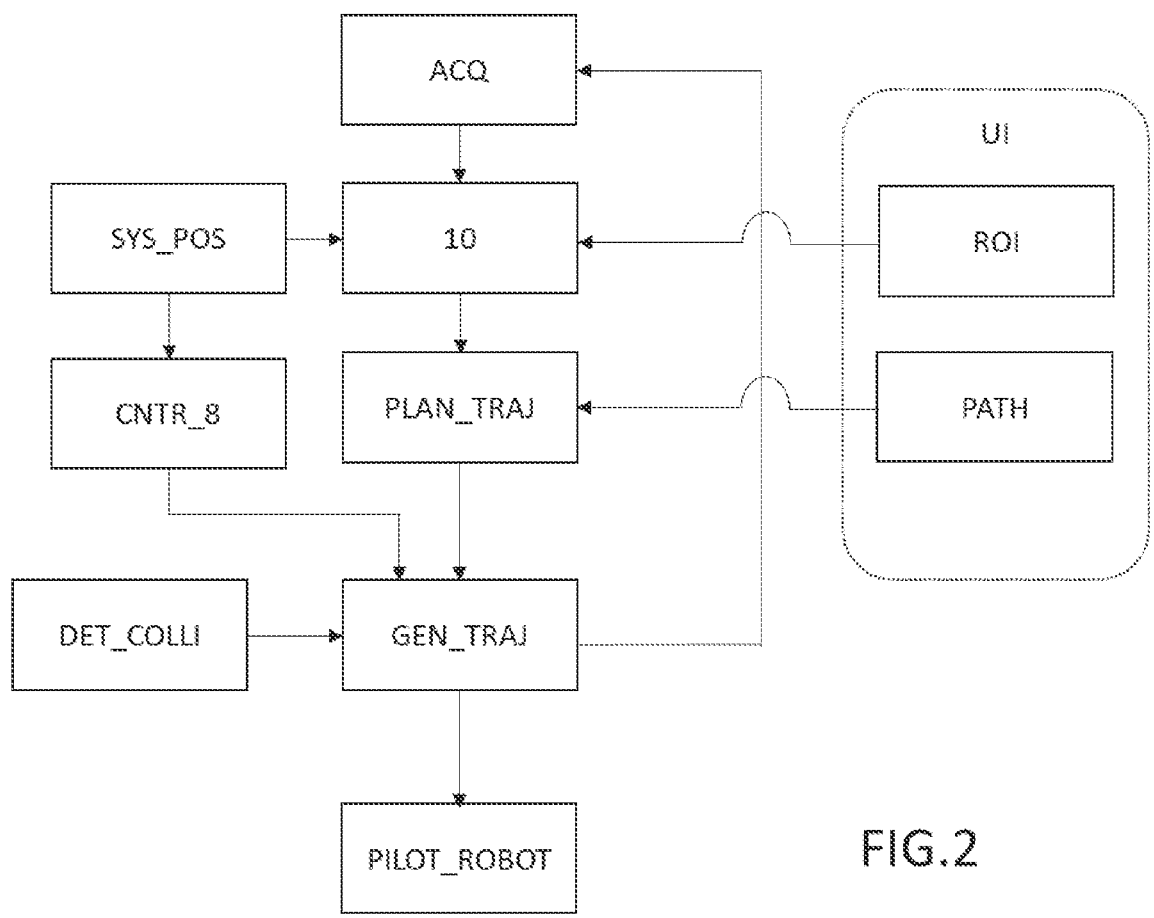
Figure 3:
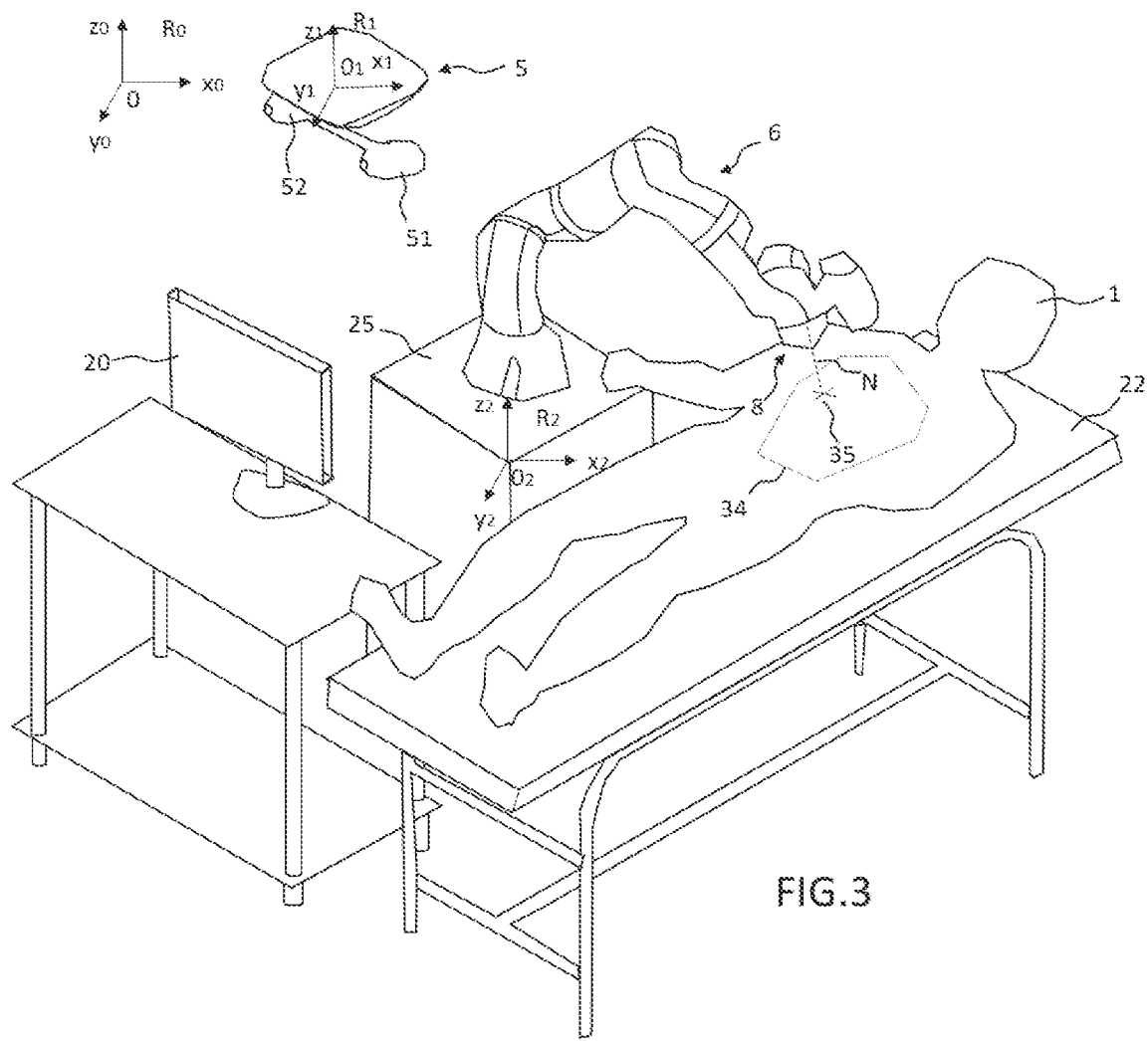
Figure 4:
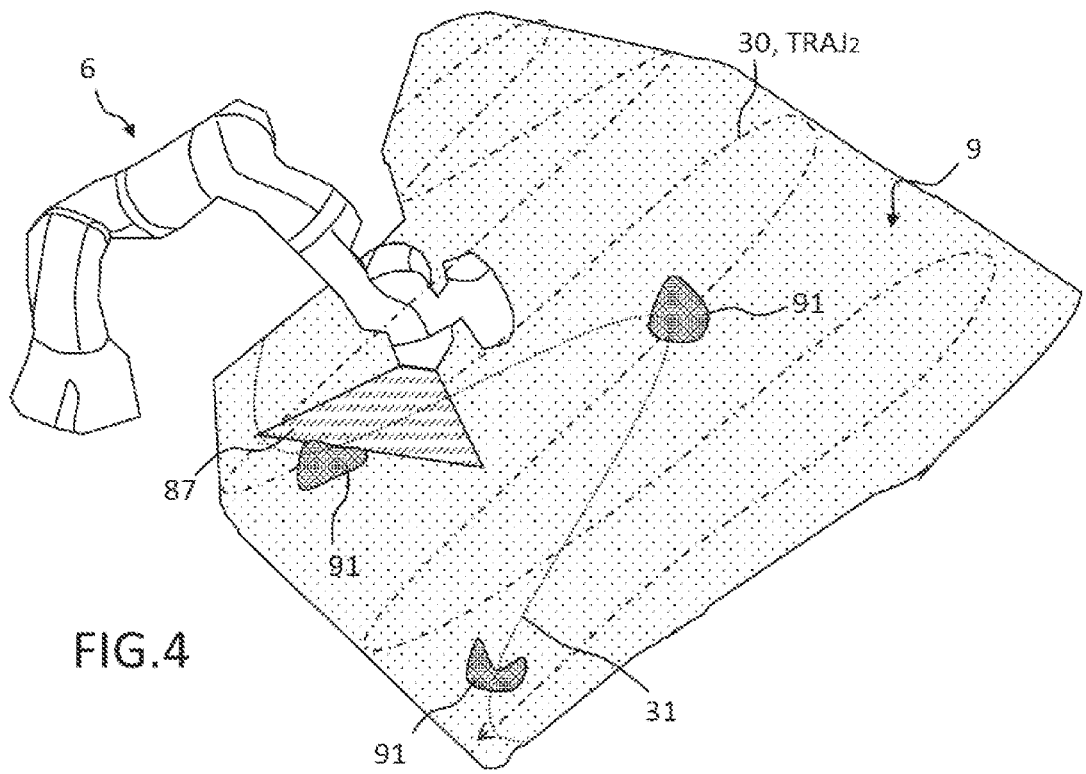
Figure 5:
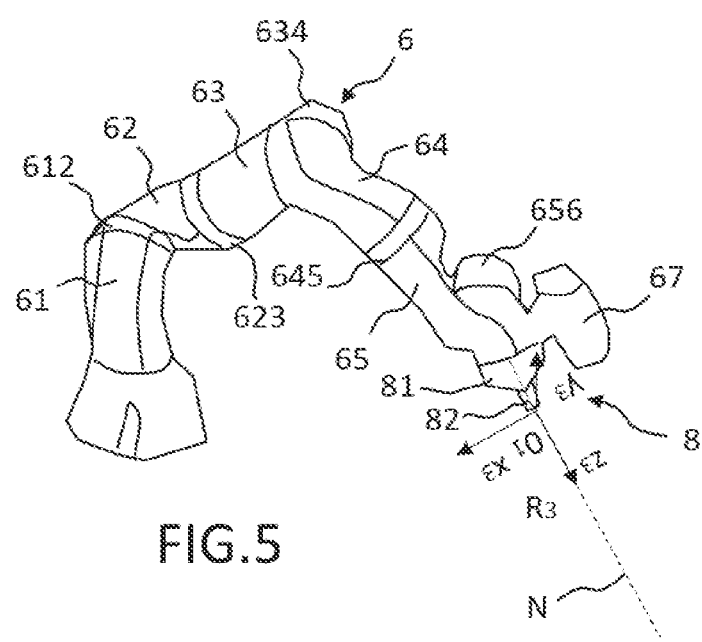
Figure 6A:
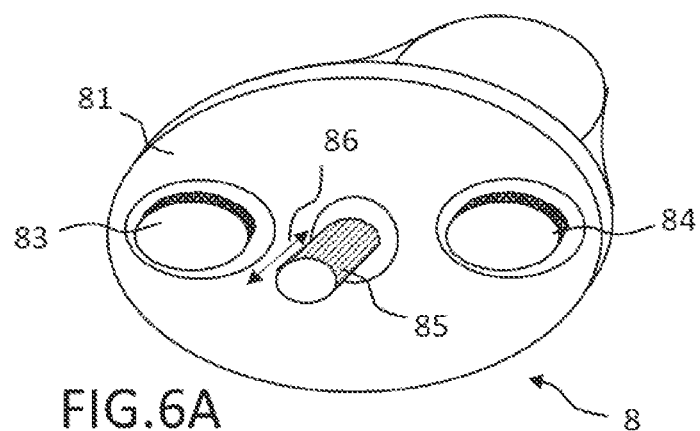
Figure 6B:
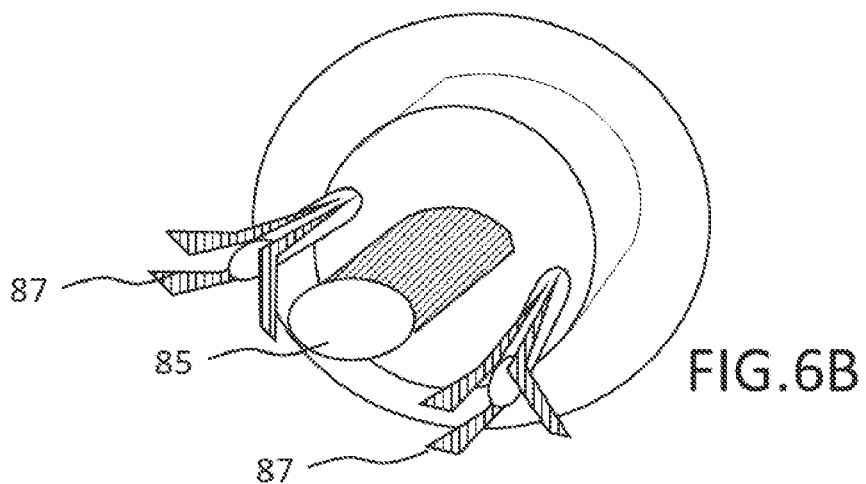
Figure 7:
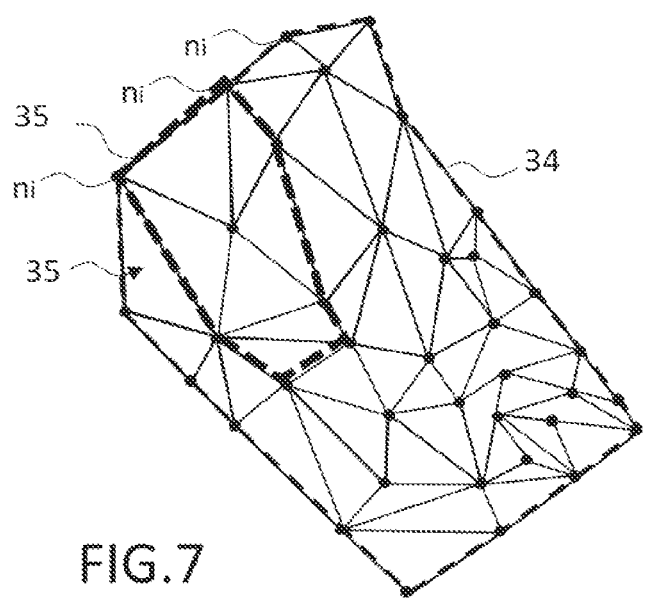
Figure 8:
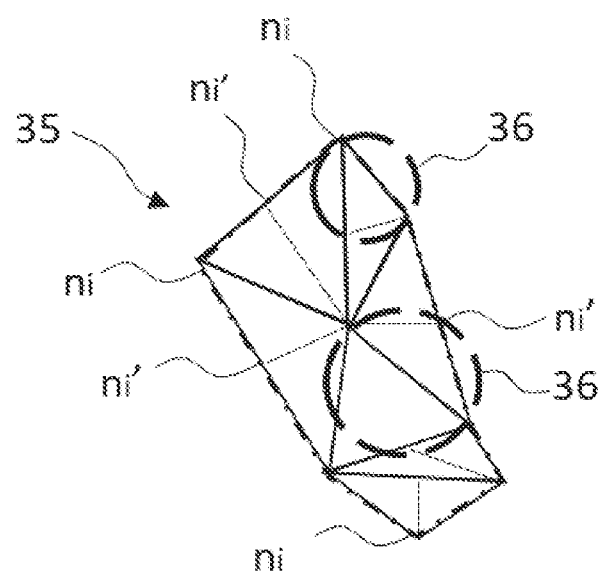
Figure 9:
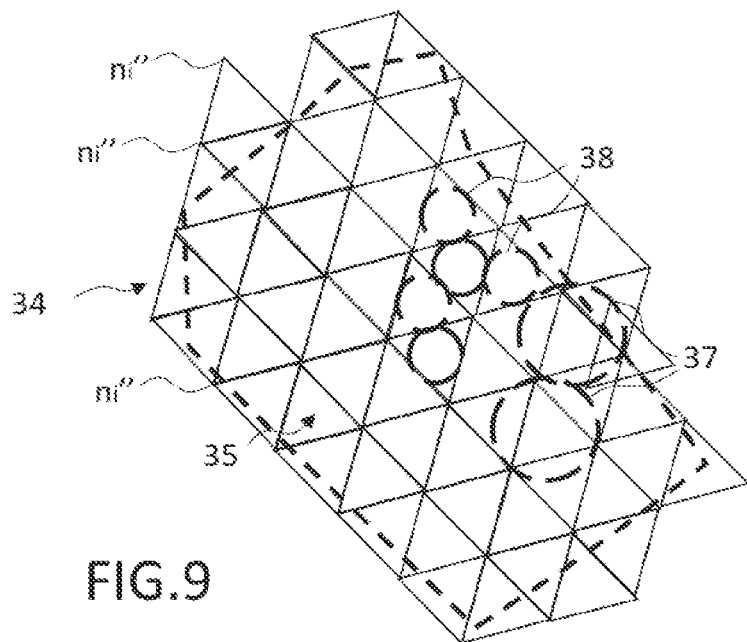

Other characteristics and advantages of the invention will become clear from reading the detailed description that follows, with reference to the appended figures, which illustrate:

FIG. 1: the main steps of an embodiment of the method of the invention;

FIG. 2: an embodiment of a system for spatially controlling the movements of a robot arm near to a surface of a body to treat;

FIG. 3: a representation of an embodiment of a system of the invention comprising an operating console, a positioning system and a robot arm manageable from the method of the invention;

FIG. 4: an example of a robot arm of the invention comprising six axes guided to travel a planned trajectory;

FIG. 5: an example of a robot arm of the invention comprising six axes illustrating a reference point of the head of the robot arm;

FIG. 6A: a first example of an operator device arranged at the head of a robot arm of the invention intended for example for a dermatological application;

FIG. 6B: a second example of an operator device arranged at the head of a robot arm of the invention;

FIG. 7: an example of a first meshing of points of a surface to treat according to the method of the invention;

FIG. 8: a first example of a second meshing obtained from an embodiment of the invention, FIG. 9: a second example of a second meshing obtained from an embodiment of the invention.

The invention pertains to a method for acquiring images of the surface of a body and reconstructing a three-dimensional surface of said body. The invention also pertains to an image acquisition and processing system. The invention also pertains to a method and a system for activating a medical device from a modelled body model. The invention pertains to the guiding for example of a robot object for the diagnosis or the treatment of the skin covering of a patient.

In the remainder of the description, a system for acquiring 5 points of the body of a patient 1 is preferentially arranged at a fixed point of space. As an example, this point acquisition system may be fixed to the ceiling, to the wall or instead to any other point of space intended to remained fixed during the execution of the method of the invention. This acquisition system 5 is referenced in a reference point noted $R_0$ $(O, x_0, y_0, z_0)$. It may also be referenced in a reference point $R_1$ $(O_1, x_1, y_1, z_1)$ associated with the acquisition system 5. From a calibration of position between the "world" frame of reference and the acquisition system 5, the acquisition system 5 may be referenced in the reference point $R_0$, by means of a transformation $R_1 \rightarrow R_0$.

In the remainder of the description, a robot arm 6 is arranged in the same space covered by the acquisition field of the acquisition device 5. It may be a treatment room of a hospital or instead a room corresponding to a doctor's surgery. The robot arm 6 may be positioned on a pedestal such as a portable item of furniture 25 and being able to be fixed at a given position during the treatment carried out thanks to the method of the invention. This robot arm 6 is referenced in a reference point noted $R_0$ $(O, x_0, y_0, z_0)$. The position of the robot arm 6 in space may be pinpointed within the reference point $R_2$ $(O_2, x_2, y_2, z_2)$ in which the movements of the robot arm 6 may be expressed easily. A change of reference point $R_2 \rightarrow R_0$ makes it possible to express the movements of the robot arm 6 in the reference point of the system $R_0$ of acquisition 5. This change of reference point may prove to be particularly efficient during the realisation of a collision detection function between the robot arm 5 and the body of a patient 1.

According to an exemplary embodiment, the acquisition system 5 may be integral with the reference point $R_2$. In this exemplary case, the acquisition system may be fixed to the pedestal supporting the robot arm 6. This configuration may be obtained for example thanks to a maintaining rod (not represented) making it possible to raise the acquisition system 5. An advantage of this configuration is to facilitate the installation of the system of the invention. Another advantage is to have available a pre-calibration between the positioning of the acquisition system 5 and the robot arm 6.

According to another exemplary embodiment, the acquisition system 5 may be fixed to a pedestal on which is installed an operating console 20. This scenario makes it possible to have available an autonomous acquisition device comprising a hardware part and a software part. A maintaining rod may also be employed to fix the acquisition system 5 or any other mechanical maintaining device.

In the remainder of the description, a head 8 of the robot arm 6, also called operator device 8, is arranged at the distal end of the robot arm 6. The head 8 may be linked to a reference point noted $R_3$ ($O_3$, $x_3$, $y_3$, $z_3$) represented in FIG. 5. The position of the head 8 of the robot arm 6 may be easily identified in the reference point $R_2$ ($O_2$, $x_2$, $y_2$, $z_2$) with the knowledge of the kinematic animating the branches of the robot arm 6. An interest is to reference the images acquired by the operator device 8 for example in the reference point $R_0$ (O, $x_0$, $y_0$, $z_0$).

The present description applies to any type of robotised object notably a robotised arm. The robotised arm of the invention may comprise a plurality of axes of freedom, notably 2 and 9 degrees of freedom. In the remainder of the description, we will consider the case of application of a robotised arm with 6 axes to describe an embodiment. However, the invention is not limited to this example.

According to different alternatives, the robotised arm may be fixed to a horizontal pedestal, the first arm extending vertically or the robotised arm may be fixed on a vertical pedestal, the first arm extending horizontally. Different configurations are compatible with the invention.

In the remainder of the description a "body model" designates a three-dimensional model of a body. This body model may be represented by a point cloud. The point cloud may be generated from a given modelling of a parametric body model obtained with a given parameterisation.

Further, this body model may be used so as to generate different partial views of this body corresponding to a sub-set of points of a point cloud modelling the whole of a body. To this end, a viewpoint may be defined to extract a partial view of a body model. Such a body model may be obtained from a configuration of a given parameterisation of a parametric model of the human body.

In the remainder of the description, a partial view of a "body model" designates a three-dimensional model of a body according to a given viewpoint from which a surface of the preceding body model is observed.

In the remainder of the description, a "parametric human body model", MOD_S designates a model being able to be parameterised so as to generate transformations of certain parts of this body or views as a function of the configuration of given parameters. A body model defined previously may thus be generated from a parametric human body model with a given parameterisation, this is known as a parameterised body model, MOD_P.

The parametric body model may be used according to a first usage during the method of the invention to carry out the regression step in order to determine a set of parameters making it possible to generate a body model for the guiding of a medical equipment for example. It may be used according to a second usage during deep learning to generate weight matrices that will be used precisely during the regression step.

According to an example, a parametric body model MOD_S may be obtained from the parametric model with the input of the following parameters:

Global translation of the model in space: Tx, Ty, Tz, i.e. 3 parameters;

Global rotation of the model in space: Rx, Ry, Rz, i.e. 3 parameters;

Angles of rotation of each articulation, for example using a parametric model comprising 24 articulations each having 3 rotation parameters: $R_{xi}$, $R_{yi}$, $R_{zi}$ defining in total 72 parameters;

Shape coefficients, for example using a parametric model comprising 20 shape coefficients. The latter influence the shape of the human body.

In this example, 88 parameters may be determined to generate a human body model.

Other examples may be implemented with the method or the system of the invention.

Acquisition of Points

According to an embodiment, the method comprises a step of acquisition of points ACQ. This acquisition may be done, for example, by means of an image acquisition device. In an exemplary embodiment, an optical system 5 in FIG. 3 comprises two sensors 51, 52 for acquiring images $IM_1$, $IM_2$. They may be for example cameras such as 3D cameras comprising at least two colour or infrared cameras. According to different exemplary embodiments, colour or infrared cameras may be used. Preferentially, pairs of identical cameras will be chosen. A prior step of calibration may be carried out to configure the colours of each camera and to make them correspond for same points of space.

Another inter-camera calibration, known as "stereoscopic calibration", may be carried out between the two cameras to produce a 3D reconstruction of a subject. The calibration aims to calculate a transformation between two images acquired by each of the cameras.

According to an example, this transformation may comprise the detection of key points and the calculation of descriptors obtained by a scale invariant visual feature transform, better known by the acronym SIF. A correlation step aiming to make key points correspond may be implemented, for example with an estimation method such as the method known as "RANSAC", designating "RANdom SAmple Consensus". Next, an isometric transformation calculation between the key points detected is carried out. Finally, the transformation makes it possible to triangulate the points of the images and thus to construct a depth map.

According to a first method, 2D images of a same object acquired from two viewpoints of which the arrangement is known may be combined according to known techniques to obtain a so-called depth or distance map.

The method of the invention makes it possible to process 2D images which are next combined to obtain a point cloud $G_1$. The points are going to constitute a first graph $G_1$. According to an example, the points of the first graph $G_1$ obtained are non-oriented and non-connected. In its simplest form, the graph $G_1$ is a non-ordered list of points of which the coordinates are referenced in space, for example in $R_0$, $R_1$, $R_2$ or $R_3$. The points are then each defined independently of the others. In its simplest form, the graph $G_1$ is thus a point cloud.

The images $IM_1$, $IM_2$ may be acquired simultaneously. Advantageously, the optics are directed along parallel axes and are colocalised. An interest is to be able to process the images by a stereoscopic technique to generate a depth map. The depth map makes it possible to address the spatial coordinates x, y, z at a plurality of points.

According to an embodiment, the colours of the images are used to generate tone differences and thus distance variations.

The depth map may be obtained by encoding the distances between the different points obtained, the resolution of which may be configured. The grey scales can vary according to a first range of values. By choosing an encoding, for example, on 16 bits, the encoding into grey scales of the depth map makes it possible to obtain great precision of the distance separating the different points.

The method of the invention makes it possible to acquire continuously a stream of images by the optics 51, 52 in order to process the latter in real time. The notations $IM_1$, $IM_2$ designate not just the images acquired but also the stream of images acquired by each of the cameras 51, 52.

The images may be processed so as to extract an acquisition perimeter limiting the zone to treat. To do so, a template may be used to avoid taking into consideration points outside of a zone of interest defined by the surface of the body.

The acquisition of two images $IM_1$, $IM_2$ and the coverage of the whole of the surface to treat makes it possible to generate a depth map of the totality of the body. The depth map comprises a set of points and distances relative to one another.

According to another example, no surface is treated at this stage of the method. The distances between points are generated independently of a shape recognition such as an outer layer of a body.

According to an example, the number of points generated per surface unit is configurable according to a desired resolution of the point cloud. To this end, the acquisition may be configured to acquire more or less images in order to increase the resolution.

According to an embodiment, a positioning system SYS_POS makes it possible to define a frame of reference and a coordinates system to pinpoint each point in a single frame of reference. This positioning system may advantageously be the acquisition device 5.

Stereoscopic calibration makes it possible to obtain the transformation between $R_0$ and $R_1$, with $R_1$ the reference point associated with the acquisition system 5. Next, the method of the invention makes it possible to calibrate the robotised object 6 with respect to the acquisition system 5 and thus to carry out the transformations of images in the frames of reference $R_2 \rightarrow R_1 \rightarrow R_0$. When a frame of reference $R_3$ is associated with the head 8 of the robotised arm 6, a transformation of $R_3 \rightarrow R_2$ is known due to the fact that the kinematic of articulation of each arm is known by a calculator and a memory of the system managing the robot arm 6.

Other Acquisition Techniques

According to an embodiment, a projection device is used to project a pattern onto the surface of the body. The acquired images may then be processed so as to analyse the deformation of the projected pattern. This technique makes it possible to obtain an additional datum and makes it possible to improve the 3D reconstruction. In particular, the detection of a deformation of a projected pattern makes it possible to improve the precision of the 3D reconstruction. In particular, the detection of a deformation of a projected pattern makes it possible to improve the precision of evaluations of the distances calculated to generate the depth map. Further, the projector makes it possible to reduce noise during the construction of the point cloud to generate the first graph $G_1$.

Consequently, the reconstruction by stereoscopy of a depth map may be obtained with pairs of cameras used optionally with at least one pattern projector. The projected light may be in the visible range or not, such as the infrared range. According to an example, the acquisition device 5 may comprise a pair of colour 3D cameras and at least one infrared projector.

According to another embodiment, the cameras used may be infrared cameras or having a range of frequencies in the near infrared.

Other techniques for constructing a depth map may be used, such as a laser transceiver device. The reflection of the laser beam makes it possible to generate a datum relative to the geometry of the reflection surface. Another technique may be to resort to an ultrasonic transceiver. An example of a system that could be implemented is the LIDAR type system.

According to an embodiment, the method of the invention makes it possible to recover a point cloud derived from the acquired images and to transfer it for example to a graphic processor, such as a GPU (Graphic Processing Unit).

Generation of a First Graph G1

The method of the invention comprises a step aiming to generate a set of points associated with spatial coordinates referenced for example in a reference point $R_0$ of space. These coordinates may be obtained from a prior calibration of a positioning system SYS_POS. The calibration may be carried out from a particular pattern acquired by an optic of the positioning system SYS_POS at the start of the method of the invention. According to an embodiment, the positioning system SYS_POS and the optical system SYS_OPT may be a same system. According to another embodiment, they may correspond to two distinct systems.

Thus, a depth map obtained by an acquisition system SYS_OPT may be exploited to obtain a set of points of space associated with coordinates in a reference point $R_0$ of space.

The method of the invention comprises a step of reception REC_DATA$_1$ of data, the data DATA$_1$ corresponding to points of space referenced in a reference point $R_0$ of space.

According to an example, the method of the invention may comprise a step aiming to segment the data associated with a predefined surface. The surface may be for example the surface of a human body. This segmentation may be carried out automatically by an analysis of data such as the data derived from acquired 2D images and/or the depth map obtained. For example, the method of the invention may comprise an analysis of differences in distance between certain points or instead by carrying out a colorimetric processing. The depth map may be used to filter the point cloud and to keep only points of interest, that is to say those of the human body.

According to another example, a surface contour may be acquired from an operating console such as the PC 20 represented in FIG. 3. According to this latter example, the contour of the surface of a body may be obtained by means of a selection tool such as a stylet or a mouse and an image represented on the screen of the console 20 by an operator. According to other examples, a selection may be made by a tactile command on a screen or a vocal command. An interest is to dismiss for example points belonging to the table 22 on which the patient 1 rests.

The method of the invention comprises the generation of a first graph GEN_$G_1$. The first graph $G_1$ may be obtained from a matrix representation of the set of points generated of the surface of the body of a patient 1. Each point is noted $v_i$ and may be represented by a vector notably comprising its coordinates in a reference point $R_0$. According to an embodiment, at this stage the first graph $G_1$ is non-ordered in the acquisition frame of reference. The notation "graph" is here used even in the simplest embodiment or the set of points corresponds to a list of points having coordinates, that is to say a simple point cloud. In other embodiments, the graph may be connected or not, oriented or not, etc.

Filtering

According to an embodiment, the method of the invention comprises a step of filtering the graph obtained, the filtering may be a temporal and/or spatial filtering. The filtering step makes it possible to reduce noise generated during the generation of the first graph G1 consecutively to the detection step.

Determination of Attributes

The method of the invention comprises a step of determining at least one attribute DET_$AT_i$ for each point $v_i$. The attributes correspond to data associated with the point $v_i$, these attributes may be of different natures: cartesian data, shape descriptors, identifiers, vectors, etc.

According to an embodiment, an attribute comprises data describing a normal vector $n_i$ at the point $v_i$ of the first graph $G_1$. The normal vector $n_i$ may be determined in different ways. The interest of the calculation of the normal vector as attribute of a point of the point cloud is to produce information relative to the convexity of the local surface.

According to an embodiment, the normal vector $n_i$ at a given point $v_i$ of the first graph $G_1$ is calculated by considering a surface generated locally around each considered point $v_i$ from the points $V_{iLk}$ in its vicinity. To this end, the spatial coordinates of each point are compared with the coordinates of the considered point. According to an example, the acquired distance or depth data are used to identify points in the vicinity of the considered point.

According to a first example, the surface considered to calculate the normal vector is calculated from the underlying surface defined by the points of the first graph $G_1$.

According to a second example, the surface considered to calculate the normal vector is calculated from a method implemented on a GPU. According to another example, the normal vector is calculated from an approximation of a local surface directly obtained from a method of the k closest neighbours of the considered point. This method of triangulation which connects a 3D point list may however be more expensive than the method implemented on GPU.

A possible exploitation of the calculation of the normal vector at a point of the graph is to increase the description of a point in order to enrich the point cloud.

Shape Descriptor

According to an embodiment, an attribute comprises at least one shape descriptor, noted $Df_i$, at each point $v_i$ of the first graph $G_1$. A shape descriptor is a local descriptive signature of the space at a point.

According to an example, a shape descriptor $Df_i$ is calculated from a sub-set of points in the vicinity of the considered point $v_i$. The method thus comprises a step of generating a graph of points reconstructed or extracted from a body model from and of a viewpoint of each image acquisition device capable of exploiting these data. As an example, when an acquisition device is arranged at the distal end of a robot arm, a partial view of a body model may be generated from the position of the acquisition device to carry out a particular treatment.

The shape descriptors may also be deduced at each point of a 3D body model obtained from the point cloud. In so far as they have symmetry and isotropy properties, the shape descriptors remain invariant during an isometric transformation, such as a rotation of the body model. This has an interest for transposing the shape descriptors, whatever the considered viewing angle.

An advantage is to carry out the calculation of the shape descriptors directly on the points of the first graph $G_1$. The invention thus makes it possible to optimise the calculation of these shape descriptors which are not applied to surface portions, but directly to predefined points of a graph. The calculations of descriptors may be carried out on the adjacency matrix of a connected graph obtained from the graph G1. The connected graph implies that each point is connected with all the others. The adjacency matrix makes it possible to obtain the points having direct connections with a given point. Further, a degree of proximity of a point vis-à-vis another may be deduced from the adjacency matrix. According to the shape descriptors, a vicinity of a point may be deduced from the adjacency matrix.

Alternatively, the method of the invention makes it possible to apply a distance threshold so as to only connect a point with its N closest neighbours.

According to an embodiment, the shape descriptors are chosen as being isometric and invariant. An interest is to obtain shape descriptors that remain invariant when a movement of the body is made with an isometric transformation.

According to a first example, the shape descriptor is of the type: "Wave Kernel Signature", noted WKS. According to a second example, the shape descriptor is of the type: "Heat Kernel Signature", noted HKS. According to a third example, the shape descriptor is of the type: "Gaussian Curvature".

According to different embodiments, a plurality of shape descriptors Dfi is calculated at each considered point of the first graph $G_1$ and is associated with each of said latter points.

Certain shape descriptors are shape descriptors belonging to the group of spectral shape analysis methods, such as HKS or WKS descriptors. The HKS descriptor is notably based on a solution of the heat equation, it is based on the Laplace-Beltrami operator.

One of the advantages of these shape descriptors is notably their invariance in certain transformations, notably in isometric transformations. Furthermore, this shape descriptor may be calculated from the adjacency matrix of the graph $G_1$. An advantage is to make it possible to take into account the relative distance of a considered point with the set of points in its vicinity.

According to an example, the method of the invention may be used while considering thresholds applied to the adjacency matrix so as to consider only a sub-set of points for which the distance is greater than a given threshold.

The WKS descriptor is itself based on a solution of the Shrödinger equation. An interest of the WKS descriptor is its capacity of spectral separation of the modelling obtained by the operator.

The shape descriptors may be chosen such that they model a local or global three-dimensional shape. When these descriptors encode a local modelling, a validity radius may be introduced. However, a global modelling will benefit from the totality of geometric invariances of the operator used.

The shape descriptor "Global Point Signature", noted GPS, may also be used. This descriptor is based on a Laplace-Beltrami type operator. An interest of this operator is its capacity to obtain a global modelling.

The shape descriptor "Gaussian Curvature", noted GC, may also be used. This descriptor offers the possibility of considering a parameterised surface and thus conversely to consider points which locally define a surface.

The descriptor "Spectral Graph Wavelet Signature", noted SGWS, may also be used to define a multi-resolution local descriptor.

An interest of shape descriptors based on a spectral shape analysis is their capacity to be mathematically processed to assemble connected or neighbouring surfaces, to segment zones and to execute shape recognition algorithms.

An advantage is to enrich the description of a point and thus to improve the performances of the regression of the neural network.

Another advantage of shape descriptors is to generate an identity at a point of the first graph $G_1$. When the body of a patient moves or changes over time, the surface of the body is considered as a deformable object of which the transformations are non-isometric. Shape descriptors make it possible to generate at each point specific features that it is possible to find again thanks to the method of the invention after deformation.

Association of Attributes

Thus each point vi of the first graph $G_1$ may be associated with the coordinates $\{x_i, y_i, z_i\}$, a normal vector $n_i$, a set of shape descriptors $\{Df_{i1}, DF_{i2}, DF_{i3}, \ldots, Df_{iN}\}$. This step is noted $ASSO\_AT_i$ in FIG. 1.

The point $v_i$ may then be constructed as a finite dimension vector of which each dimension corresponds to a given attribute. A second graph $G_2$ may then be generated. This second graph $G_2$ corresponds to a list of vectors enriched with their attributes $AT_i$.

Regression

A calculation step enabling the three-dimensional reconstruction of the human body acquired and enriched by means of an approximation by a parametric human body model. This step is noted REG in FIG. 1. The objective of the regression step is to estimate given parameters to configure the parameterisable body model with these parameters. Thus, from a partial view acquired by the camera, a complete parameterised body model may be estimated.

To this end, the method of the invention then comprises a step of calculating a set of geometric parameters comprising shape and rotation $ROT_i$ parameters.

The rotations may be calculated at a plurality of points of the second graph $G_2$. According to an embodiment, the rotations are calculated for each point of the second graph $G_2$. According to an embodiment, each rotation may be associated with an articulation. An articulation may be associated with a delimited region of the parametric body model MOD_S and a given articulation may be thus associated with a parameterised body model MOD_P. A given articulation may thus be associated at the end of the regression operation with a set of points of the second graph $G_2$.

The shape parameters may be defined by a set of positions of points of a parameterised body model in a given reference point.

According to an embodiment, the input parameters are the set of points of the point cloud $G_1$ or $G_2$ provided with their attributes calculated in Euclidean space $R^3$.

According to an alternative, the input parameters may be the adjacency matrix corresponding to the graph $G_1$ of each point of the point cloud. These inputs enable a study in the spectral domain of the input and do not necessarily require the taking account of attributes.

The shape parameters and the rotations of a set of articulations correspond to the output parameters of the neural network. It is these parameters that will make it possible to configure the parametric body model MOD_S to generate a parameterised body model MOD_P.

According to an embodiment, the regression step comprises a series of mathematical operations such as matrix operations between the input matrix and a weight matrix trained beforehand by a deep learning method.

Each of its operations being followed by a non-linear function. These are activation functions or transfer functions making it possible to produce the output of a node of the network. As an example, non-linear functions such as ReLU, Sigmoid or Tanh may be executed.

According to an example, the step comprises a regression carried out from a series of convolutions of layers of a neural network trained from a plurality of predefined parameterised body models MPPi$\}$i$\varepsilon$[1; N].

They may be convolutions or layers of the neural network. Indeed, the network may comprise in its first layer convolutions, or fully connected neurone layers at the end of the model. In this latter case, they are neurones connected to all the neurones of the preceding layers and connected to all those of the following layer.

The convolution layers may comprise a scanning of an input matrix producing a series of matrix calculations. The other layers of the neural network generally comprise matrix calculations on the size of the input matrix. In all cases, the step comprises matrix calculations.

According to an example, each convolution comprises a matrix product between an input matrix and a weight matrix and the taking into account of an additional bias.

The application of a processing by successive layers within the neural network comprises the application of a series of matrix multiplications which are followed by a non-linear function to a produce an output of a layer. The succession of these operations defines the depth of the neural network.

According to an exemplary embodiment, the neural network is a multilayer perceptron, known by the acronym MLP. According to an example, the neural network may be a network equivalent to the MLP.

According to an example, the neural network is configured such that the result is invariant by permutation of the points of the input list. This configuration is made possible by the use of pooling functions such as the function known by the name "MAX POOLING" or "AVG POOLING".

According to an embodiment, the structure of the neural network makes it possible to extract attributes of the input at a different scale. The vicinity of each point of the point cloud at different scales is successively considered to extract an encoding in a space of reduced input dimension.

This encoding is next passed in a series of fully connected layers to perform a regression on the set of parameters of the parametric human body model.

Successively steps of sampling and/or of grouping together the vicinity of the sampled points then grouping together these points are repeated and encoded by convolution layers to create maps of the parameters obtained.

The method of the invention advantageously makes it possible to create a function conserving the symmetry of the set of points at the input of the network with that at the output of the network. Thus, the application of the neural network to a non-connected, non-oriented graph may be ensured by the implementation of this symmetry conserving function. This function ensures an independence of this step vis-à-vis the ordering of the input points.

This function also enables the implementation of self-encoders within the processing of the regression.

The set of parameterised models may be obtained from a generic model. An interest of such a model is to be able to generate a plurality of poses of a human body from a parameterisation of the articulations and shape parameters. A particularity of such a body model is that it may be modelled by a set of articulations each comprising at least one rotation and position. A rotation of an articulation may be defined by an angle. The position of the articulation may be associated with at least one position of at least one point of the graph or several points of the same graph. According to another example, the position of the articulation is obtained from an operation combining different positions of the graph for example to generate a new position of a new point. This new point may be for example a barycentre of a sub-set of points of the graph. Shape parameters may be parameterised to define global shape parameters of the body.

The set of configuration data of a set of articulations in position and in rotation makes it possible to define a given pose of the body model. Thus, it is possible to generate a plurality of poses of the body model.

According to an embodiment, the parametric modelling of the human body is a meshed network of points. Each parameterised articulation generates a configuration associating a sub-set of points of the meshed network of points.

According to this latter example, 24 articulations may be defined from 72 rotation parameters, each of the articulations is associated with 3 rotations. This parametric model may also comprise 3 global rotations. A sub-set of articulations may be extracted to realise an embodiment of the invention, such as the wrist, the elbow, etc.

Each articulation may also comprise a set of shape parameters such as the width of the wrist, the length of the wrist, etc.

According to an exemplary embodiment, a PCA (principal component analysis) function makes it possible to extract general parameters of which the configuration makes it possible to act on a set of parameters of a plurality of articulations. As an example, the size of an individual, thickness of the ventral zone, corpulence, size of the pelvis, etc. may be configured to pre-regulate a set of local parameters linked to a plurality of articulations.

The parameterisation of a body may comprise a plurality of vectors defining a shape and an angle. As an example, it may be the ankle, waist, arm, etc. A general configuration makes it possible to obtain a silhouette or a given template of the body which may be parameterised.

Other parameterisable body modellings may be used with the method of the invention.

Learning of the Neural Network

The neural network is trained by automatic learning, better known by the expression "machine learning".

Such a machine learning algorithm may comprise a step of recovery of a database of high definition human body scans. Then, steps of deformations of a body template of the parametric model by the application of isometric transformations. The transformations may comprise translations and rotations and combinations thereof applied to different facets of the template so as to conform to the scans derived from the recovered data. This step may comprise the execution of a cost function to optimise by descent of gradient for example.

The method comprises a step of pooling the transformations made on each scan. The principal components of the transformations are then deduced by an ACP type method.

The application of this algorithm makes it possible to extract the principal shape and position parameters of a human body.

In order to generate a set of partial views VP of a set of parameterised body models obtained from a plurality of parameterisations of a parametric body model, a ray tracing algorithm may be applied. The algorithm can take into account a large number of different viewpoints in order to generate a multitude of partial views VP from a given parameterised body model. An advantage is to avoid a step of calibration during the execution of the method of the invention and to come closer to the real world when the images of a body of a patient will be acquired. The multiplication of learning with a large number of partial views makes it possible to avoid steps of treating the body such as translations or rotations of the data acquired representing the body of a patient.

An interest of this solution is to generate a large number of body models by varying parameters with different partial views of a body model. These latter partial views VP corresponding to a sub-set of the point cloud defining the whole of the body. An advantage is to train the neural network with a multitude of configurations being able to correspond to the case of acquisitions of a real body during the use of the method of the invention. The viewpoints correspond to capture points of a camera for example. In order to constitute the most complete possible library of data representing body models, the viewpoints are multiplied around the surface of each body generated from the parametric model. Thus, a multitude of body surfaces represented according to different viewpoints is saved in a memory. The data set generated to train a neural network with a view to carrying out the regression step is a set of partial views VP of a plurality of parameterised body models MOD_P.

An advantage is to train the weight of the regression with the shape descriptors associated with each point of a body model such that it can be perceived in reality. The shape descriptors may be obtained for each partial body model view VP generated and for each point of a given body model. The shape descriptors obtained thanks to the learning make it possible to define weight matrices, otherwise called matrices comprising weighting coefficients for each layer of the neural network. In the course of the regression carried out in real time during the calculation of a body model of a patient, the regression step will advantageously be carried out with the weight matrices defined by the learning step.

The parameterised body models MOD_P thus generated thereby make it possible to train the neural network used to carry out the regression step REG. The regression carried out in real time then makes it possible to extract the parameters characterising the considered body.

This step makes it possible to obtain a body model of which the surface may be easily extracted and to consider a complete parameterised body model and not a part only seen from the camera An advantage of the method of the invention is to reconstruct a three-dimensional surface in real time by inference. This solution is based on the use of models that have been trained thanks to a deep learning technique. An interest is to be able to do without an optimisation method, such as iterative methods, for example, by a gradient algorithm which requires longer computation times and integration limitations for the real time enslavement of the robotised arm. An interest of the method of the invention is to realise the optimisation during the learning and not during the processing of data acquired during the guiding of a robotised arm.

The deep learning inference comprises matrix multiplication operations with previously trained weights.

According to an embodiment, the layers of the neural network comprise a resolution dependent on the considered layer. The scale may become greater and greater as one descends into the layers of the network. An example of neural network such as an MLP network may be used.

First Meshing, $M_1$

The method thus comprises a step of extraction of a meshed surface. The meshing of the surface obtained is a first meshing noted $M_1$. According to an embodiment, the first meshing $M_1$ is a meshing in which triangles are defined by points of the surface considered with points in their vicinity. FIG. 7 represents an example of meshing $M_1$ comprising a plurality of triangles formed by triplets of points $n_i$ colocalised within the considered surface.

According to another embodiment, another meshing pattern may be considered in other embodiments of the invention: quadrangles, squares, pentagons and generally any type of polygon of which the summits are points of the meshing.

The meshing $M_1$ is created after the regression operation. Before the regression step, the point cloud is considered such that each point is independent of each other, the points are not linked together.

Second Meshing, $M_2$

According to an embodiment, the method of the invention comprises a step of defining a second meshing $M_2$ from the first meshing $M_1$. The second meshing $M_2$ may advantageously be defined so as to generate triangles made semi-homogeneous, for example isosceles triangles. In this example, the triangles may be transformed according to a given algorithm for example using symmetry properties of the generated meshing.

FIG. 8 represents an exemplary embodiment of a second meshing $M_2$ obtained from a transformation. The meshing $M_2$ comprises a set of points comprising a first set of points $n_i$ remaining invariant and a second set of points $n_i'$ generated from the creation of a bisector of each considered triangle to create two new isosceles triangles.

Other techniques may be employed to homogenise a meshing in order to regularise a meshing. According to another technique, equilateral triangles are generated such as represented in FIG. 9. An advantage is to generate a completely homogeneous meshing notably making it possible to facilitate the guiding of the operator device 8.

The method of the invention makes it possible to apply transformations to the points of the meshing such that their attributes are also transformed as a function of the cartesian positions of each new point generated.

According to an example, the desired resolution of the meshing $M_1$ or $M_2$ is obtained as a function of a parameterisation of the sensor or sensors or the transmitter or transmitters at the end of the robotised arm. The resolution of the graph $G_1$ may be configured of variable size and be independent of the resolution of the meshing $M_1$ or $M_2$. As an example, the circles 36, 37, 38 represent desired aiming points of a power to deliver from a laser on a surface of the skin of a patient 1. An interest of this solution is to generate a dermatological resolution suited to the treatment to apply.

Thus, FIG. 8 illustrates circles 36 of different sizes obtained by a meshing having isosceles triangles of different dimensions. Thus, a coefficient must be applied at the moment of the shot to adapt the power applied to the signal.

According to another example, the second meshing $M_2$ may be made homogeneous by a series of geometric processings in order to obtain triangles of equivalent dimensions.

FIG. 9 represents an aiming point 37 or 38 of a power to deliver from a laser on a surface of the skin. An interest of this meshing configuration is to be able to obtain a same shot configuration from one triangle to the other. The triangles 38 are tangential between each other and make it possible to control an amount of overlap parameter.

According to an embodiment, a new meshing $M_3$ is defined by circles 36, 37, 38 generated from the second meshing $M_2$.

Real Time Enslavement

According to an embodiment, the acquisition device 5 carries out in real time an acquisition ACQ of points of all or part of the body of a patient 1 in order to calculate a parameterised body model MOD_P from the method of the invention that is adapted to enslave the movements of a robot arm 6. The guiding of a robot arm 6 is carried out from a treatment trajectory $TRAJ_1$, noted 30 in FIG. 4, established within a defined zone 9 of the surface thus modelled and recalculated.

The trajectory $TRAJ_2$ of the robot arm 6 may be automatically generated from the treatment trajectory $TRAJ_1$ as a function of an orientation and a relative distance between the head 8 of the robot arm 6 and the surface of the skin to define, for example, by means of a user interface UI. The orientation is determined by default at 90°, that is to say that the principal axis of a sensor or a transmitter of the head 8 of the robot arm 6 is merged with the normal N to the target point of the surface of the considered body, notably of the parameterised body model MOD_P which has been generated beforehand. The distance corresponds to the distance of a point of the sensor or the transmitter of the head 8 of the robot arm 6 and an aiming point, noted target point $P_{TARGET}$ on the surface of the modelled body generated at the position of the patient.

An interest of a calculation in real time of the modelled surface of the body of a patient 1 is to anticipate, for example, movements of said patient 1 to take into account movements, for example, arising from the breathing of the patient 1.

The advantage of the method of the invention is to be able to generate a new modelled surface in less than 30 ms. These response times notably make it possible to enslave the movements of a robot arm 6 with a sufficient speed to anticipate collisions or sudden movements in order to get clear as quickly as possible. The configuration of an acquisition by a camera may be for example of 10 to 90 fps.

The enslavement in real time of the robot arm 6 makes it possible to activate at least one transmission of a transmitter and/or an acquisition of a sensor of an operator device 8. The activation is then carried out when the orientation of the axis of the sensor or the transmitter is perpendicular to the straight line passing through the target point $P_{TARGET}$. The target point $P_{TARGET}$ is referenced on the parameterised body model generated. The latter is generated at the position and the orientation of the operator device 8. The target point $P_{TARGET}$ may be obtained before the guiding of the robot arm 6, for example, during the planning of a laser shot or ultrasonic shot strategy. According to another case, the target point $P_{TARGET}$ is obtained during the guiding for example when a comparison of images realised activates a change of the guiding to activate another detector.

In all cases, the target point $P_{TARGET}$ is defined according to a guiding strategy and its position may be corrected when the considered surface of the body undergoes a transformation imposing an adaptation of the guiding strategy.

According to an embodiment, the acquisition ACQ made by the device 5 may also be coupled to an acquisition of images made by an optic arranged at the end of the robot arm 6. This may be the case when the movements of the robot arm 6 mask the zone of interest of the body of the patient 1 to acquire by the acquisition device points 5 or when movements of small amplitudes are controlled by the distal optic of the robot arm 6.

Thus two modes of enslavement may be carried out and potentially combined to generate a new modelled surface during the execution of a treatment.

Robot Arm

The robot arm 6 is guided by a movement controller GEN_TRAJ which takes into account different constraints to enslave the robot arm. Notably, this controller takes into account a planning of a configured trajectory and the definition of a zone to treat by a user. This surface is defined on the surface of the reconstructed body according to the method of the invention. Further, the controller CTRL can take into account an instruction coming from a collision detection module to adapt the travel of the robot arm in real time. Finally, the controller CTRL takes into consideration data coming from the head of the robot 6 by means of a module CNTR_8, for example when a detection of a singular image imposes a particular manipulation of the robot.

According to an embodiment, the robot arm 6 comprises a set of branches 61, 62, 63, 64, 65 articulated by means of pivot articulations 612, 623, 634, 645, 656. The robot arm 6 comprises in this case 5 branches articulated from pivot links. According to an alternative, it comprises 6 articulated branches and, according to other alternatives, it may comprise 7, 8 or 9 articulated branches. Indeed, in this embodiment, each articulation is capable of making at least one rotation between two adjacent branches.

According to an embodiment, each branch of a robot arm comprises a force sensor. An advantage is to prevent sudden collisions. When a contact is established between a branch of the robot arm 6 and an object, the movements of the robot arm may be automatically stopped or its guiding modified so that it changes its trajectory.

According to an embodiment, a step of calibration of the robot arm 6 is carried out prior to the method of the invention. The calibration may comprise the relative positioning of the robot arm vis-à-vis the reference point $R_0$ as well as its initial position.

Operator Device and Optic

According to an embodiment, the robot arm 6 comprises an operator device 8 advantageously arranged at the end of the robot arm 6. According to the embodiments, the optic 67 may be arranged so as to be out of axis with respect to the head 8 of the robot arm or it may be arranged at the end of this head, as in the case of FIG. 6A.

An interest of the configuration of FIG. 3 is to provide the head of the robot arm, for example, with a laser device or a device generating ultrasounds for localised treatments and to displace the image acquisition optic. An interest of the configuration of FIG. 6A is to configure a robot arm 6 for dermatological image capture applications. However, all the configurations may be envisaged as well as combinations of the preceding cases.

According to an example, the operator device 8 comprises at least one sensor and/or at least one transmitter. The operator device 8 is also called the "head" of the robot arm 6.

In the example of FIG. 5, the robotised arm 6 is provided with one or more optic sensors 67 for acquiring local images of the surface of the skin. An interest of the capture of local images at the head of the robot arm 6 is the possibility of reconstructing a "coloured" body surface, that is to say in which the captured images are integrated in the parameterised body model MOD_P generated by the method of the invention. To this end, the optical device situated at the end of the robot arm 67 or {83; 84} may preferentially comprise two optics so as to reconstitute a depth map associated with the images acquired simultaneously by the two optics. The images may then be indexed on the surface of the parameterised body.

Other Transmission/acquisition Devices

Further, the operator device 8 may comprise an ultrasonic, radiofrequency or laser type transmitter, or any other source of signals capable of being used to generate an incident beam. According to an embodiment, the operator device 8 may comprise an array of focused transmitters and means for controlling the direction and the transmitted power.

When an ultrasonic transmitter is arranged at the end of the operator device 8, an ultrasonic receiver may be associated to measure the reflected signal so as to construct an image of the dermis and/or an image of the thickness of the skin of a patient, or even an image of vessels or an organ.

FIG. 6 represents another embodiment in which the operator device 8 comprises a receiving head 80 positioned at the end of said operator device. The receiving head 80 comprises two local optics 83, 84 to take images of the surface of the body and a millimetric or microscopic optic movable in two directions along a longitudinal direction 86. An interest is to generate images with millimetric resolution comprising a resolution for dermatological applications, for example for diagnostic applications.

Guiding of the Robot Arm

Initially, the generation of the movement of the robot arm 6 is defined by means of a trajectory configured by the user by means of a component noted PATH in FIG. 2. The user can select a zone of interest of the surface of the body of a patient 1, such as a zone: "an arm", "a leg" or a portion of this zone or instead the whole body.

The selection of a zone may be made by means of a user interface UI. The zone may be marked out by means of a stylet or by means of a mouse or instead by the selection of one or more predefined zones that the user selects. According to another example, the selection may be carried out by means of a tactile command directly on a display or by means of a vocal command.

The selection may be made on a parameterised body model MOD_P generated by the method of the invention 10. The module enabling a selection of a zone to be made is noted ROI in FIG. 2. The parameterised body model MOD_P may be represented on a display of the user interface UI. When a zone is selected, an extraction of a surface portion may be carried out on which the trajectory of the operator device 8 is going to be defined. According to an example, a trajectory 30 may be automatically defined from the dimensions of a selected zone. For example, as a function of the operation to perform with the operator device 8, such as image captures, a laser treatment and/or a treatment from an ultrasonic source, the automatic trajectory generation function may be implemented in different ways. When it involves taking image captures on a predefined zone, the objective is to cover the totality of the selected zone. Thus, an optimised trajectory may be calculated as a function of the resolution of the optic and its field.

When a user himself defines a trajectory on the selected zone, the trajectory is acquired by the component PLAN_TRAJ that is going to optimise or calculate travel parameters of the robot arm to cover the selected surface.

The method of the invention makes it possible to carry out a guiding in real time of the robot arm 6. To this end, the module for generating GEN_TRAJ movement of the robot arm 6 is implemented. In order to calculate in real time the trajectory as a function for example of the movements of the patient, a capture of a singular image or instead the control of an end of travel in the event of contact with an object, the module makes it possible to recalculate in real time the course of the robot arm 6.

The guiding of the robot arm 6 is configured, for example, from a cartesian coordinates system referenced in the reference point $R_0$. The orientation of the end of the robot arm 6 may be configured by controlling the orientation of the normal N represented in FIG. 3 or 5. The normal N is defined by an angle at 90° with the aiming point of the surface of the body. An interest of this parameterisation is that each point of the enriched meshing already comprises an attribute corresponding to the normal of a point of the model. Thus, the guiding of the orientation of the head of the robot arm may be carried out by aligning the orientation of the robot on the normal N of the surface of the body.

According to an embodiment, the distance between the end of the head 8 of the robot arm 6 and an aiming point 35 of the modelled surface of the body of a patient 1 is enslaved to remain substantially constant, for example by a distance of 5 cm. Thus, the guiding of the robot arm 6 is enslaved along an orientation and a distance to the skin of the patient 1.

A collision detection function DET_COLLI may then be implemented in order to deliver a control instruction to the movement generation module GEN_TRAJ of the robot arm 6. Further, this module takes into consideration the initial trajectory established by the component PLAN_TRAJ. Finally, the movement of the robot arm may also be managed as a function of a control function CNTR_8 of the head 8 of the robot arm 6. When one or more optical devices are mounted at the head of the robot arm 6, an enslavement of the robot arm may be necessary to activate a second optic.

According to an embodiment, the optical system 5 is configured to control each movement of the body 1 by means of a control loop. This control makes it possible to compare the differences between the images acquired at an instant with new images acquired consecutively. The interest of such a control is to make a modification of the guiding of the robot arm 5 by adapting its initial travel to a new trajectory. To this end, a collision detection function DET_COLLI may be implemented so as to adapt the movement of the travel of the robot arm 6. The generation of the movement of the robot arm 6 is determined by the function GEN_TRAJ.

According to an embodiment, the head of the robot arm 6 is removable such that the latter can be used for different applications. A head comprising one or more optical devices for dermatological applications may be for example replaced by a head comprising a laser for applications of treating the surface of the skin, such as an epilation, a tattoo removal, or an Ultherapy for lifting applications.

According to the targeted application, a given optical configuration may be preferentially chosen.

According to an example, an arrangement of optics having different focal points is implemented at the end of the head of the robot arm 6. These optics may be articulated or displaced independently or conjointly according to the embodiments.

According to an example, at least one optic is a confocal microscopy system. According to an example, the focal plane may be displaced so as to produce images at different depth levels. A local three-dimensional image of the surface of the skin may be reconstructed. This application may find an interest for reconstructing a volume such as that of a beauty spot on the surface of the skin.

In the case of use of a confocal optic, lighting may be obtained from a light source, such as a laser.

According to another example, at least one optic is configured to produce a series of images in section to implement a tomographic technique. According to a given configuration, this technique may be of OCT (optical coherence tomography) type. These techniques often involve coupling a sensor with a transmitter such as a laser transmitter.

Other possible applications concern treatments from ultrasonic transmissions. To this end, at least one ultrasonic transmitter may be arranged at the level of the head of the robot arm. This or these transmitters may be associated with a sensor to measure an echo signal or a modification of the transmitted waveform. According to an example, it may be a matrix of transmitters organised to generate a beam focused at one point. The powers may be configured to burn a tissue or to measure the elasticity of a singularity on the skin covering by creating an acoustic pressure on the surface of the skin.

The head of the robot arm may also be provided with a sensor making it possible to probe a mechanical property of the skin, such as its elasticity, its firmness, its hydration or instead its roughness.

According to another example, a fluorescence sensor is arranged at the distal end of the robot arm 6. Such a sensor makes it possible to monitor biological active ingredients for example for cosmetic applications. According to another example, a spectroscopy technique may be employed to carry out a molecular characterisation.

Dermatological Application

According to an embodiment, the head of the robot arm 6, also called "operator device" 8, is equipped with an optical system for dermatological applications. In this case, a double optical device may be arranged. A first optical device 83, 84 comprises cameras carrying out a so-called "macroscopic" scan due to the movement made by the robot arm 6. These cameras carry out a capture of images of interest of the surface of the skin. According to an example, a light source makes it possible to light up the captured zone. The transmitted light may be in the visible or the infrared or instead a fluorescent source for example. According to an example, an LED system comprising a polariser is configured to transmit polarised light. In the case of polarised light, the LED type light source is covered with a polarising filter. In this example, a camera arranged at the end of the head of the robotised arm is equipped with a polarising filter. The filters of the light source and the camera are, according to an example, configured orthogonally.

When a singularity is detected, the robot arm 6 is controlled so as to modify its trajectory. A positioning of the head is carried out on a point of the singularity detected, for example the centre or the barycentre of the zone forming the singularity. The guiding is thus stopped and the initial trajectory is temporarily suspended.

A controller activates a second optical device 85 enabling a capture of millimetric or microscopic images with dermatological resolution. In order to obtain good resolution, the optical device 85 may be controlled according to a movement 86 along an axis perpendicular to the plane of one of the optics 83, 84 or 85.

FIG. 4 represents a portion of a surface 9 of a body of a patient 1 on which is represented a trajectory 30. The trajectory 30 may be obtained from a scanning strategy of the robot arm 6. According to an example, the generated trajectory 30 is obtained thanks to a planning module PLAN_TRAJ. In the example of FIG. 4, three dermatological singularities 91 are represented on a portion 9 of skin of a patient 1. These may be for example a scar, a melanoma, a beauty spot, or any other skin surface singularity. When the optical field 87 of the first optical device 83, 84 intercepts a singularity 91, the images acquired are analysed dynamically to enslave the control of the robot arm 6.

The second optical device thus makes it possible to take an image of a close up zone of the surface of the skin of a patient 1. According to an example, the second optical device 85 is a Dermatoscope. The second optical device 85 may comprise a glass plate coming into contact with the skin. According to an exemplary embodiment, the second optical device may comprise a transmitter of polarised light so as to obtain information of an in-depth image of the epidermis.

To this end, the last branch 66 of the robot arm 6 or the operator device 81 may be equipped with a force feedback sensor in order to brake the travel of the second optical device 85, or even to stop it and stabilise it. When the second optical device 85 is in contact with the skin of a patient 1, the triggering of a shot may be engaged.

According to another example, each axis of the robot is equipped with a force sensor. The analysis of the force values read on the sensors are used to enslave the pressure exerted on the surface. Thus, the robot, thanks to these torque sensors in each axis, makes it possible to enslave a contact pressure between a tool and the working surface, in this case the skin of a patient. This may also be used to carry out a "sliding" of the tool on a working surface.

According to an embodiment, a scanning device 87 is activated in order to move hairs away from the optic 85. Such a scanning device 87 may be automatically implemented during the stabilisation of the optic of the second optical device 85. An interest is to avoid the image capture of hairs situated near to a singularity of which it is wished to take an image capture. The scanning device 87, according to an embodiment, comprises a rotating rod which activates flexible pincers near to the optic 85. An advantage is to turn the hair such that it no longer remains between the optic 85 and the skin. According to an exemplary embodiment, a plurality of scanning devices 87 is arranged around the optic 85. FIG. 6B represents two thereof.

When the second optic has captured one or more images with a more precise resolution of the singularity, the second device 85 can make a retraction movement to come back to its initial position. The robot arm can then continue its travel and return to the guiding trajectory that has been planned.

According to an exemplary embodiment, the guiding is carried out at a distance comprised between 1 cm and 20 cm from the surface of the body of a patient 1. According to a preferential embodiment, the guiding is carried out at a distance comprised between 2 cm and 8 cm from the surface of the skin.

According to an embodiment, at a given distance from the surface of the robot, the characteristics of the optics being known, the field of view of the optic may be obtained. These characteristics make it possible to know the portion covering the images acquired on the complex surface of the body of the patient. An advantage is to be able to make the images correspond precisely with the three-dimensional surface of the body of a patient. Further, the possible indexing of images acquired on the generated parameterised body model MOD_P, the images may be arranged in a given position of said model. Thus, a three-dimensional representation of a body may be archived with images accessible for a user capable of representing singularities of the skin. The association of images acquired with the generated parameterised body model may be carried out from the meshing $M_1$ or $M_2$. When the meshing comprises, for example, triangles, an image may be subdivided so as to make said triangles correspond with the surface of the image.

According to an embodiment, the invention comprises a step of referencing the captured images with a set of nodes of the meshing. According to an exemplary case, each triangle of the meshing comprises an identifier. The images may then be saved with a datum associating said image with a set of identifiers.

According to an embodiment, the images acquired by the optics 83, 84 and 85 are saved in a memory, for example the memory of the movement controller of the robot arm 6. According to an alternative, the operator device 8 comprises an electronic board provided with at least one calculator and a memory. The images acquired may be saved firstly locally before next being transmitted to a remote electronic device.

According to an exemplary embodiment, each photo taken simultaneously by the optics 83 and 84 is associated one with the other. The images acquired may be, for example, time stamped and associated with a point of space in the reference point $R_0$. They may also be associated with a point pinpointed with respect to a frame of reference $R_3$ linked to the operator device of the robot arm 6 or instead referenced vis-à-vis the trajectory 30.

When an image is acquired with the second optical device 85, the latter may be associated with the images acquired by the first optical device 83, 84 and in particular at the same position of the trajectory 30 as that at which the operator device 8 has activated a movement of the second optical device 85.

An advantage of the invention is to be able to index each acquired image with an image on the parametric model generated from the regression step REG. Thus, the method makes it possible to locate a portion of image on the skin and to index it on a generated model. An advantage is to conserve a precise trace of the photographed zone with respect to the geometry of the body. Thus, when a patient changes position or when said patient returns for another subsequent visit, the indexing of the photos that has been saved makes it possible to generate directly a new plotting of the zone of interest already indexed as a function of a new image acquisition.

An interest is to constitute a bank of images of different resolutions of different portions of the considered surface of the body.

In order to obtain a good response of the arm of the robot 6 during the acquisition in real time of images captured by the operator device, the acquired images may be compared with a bank of characteristic images. According to another example, a trained neural network makes it possible to carry out a classification of the images acquired to classify them and to generate a command according to the result of the classification. As an example, the detection of certain singularities does not require the activation of the second optical device 85 whereas the detection of other singularities requires an image capture with a more accurate resolution.

According to another exemplary embodiment, the robot arm 6 carries out a first planned trajectory 30 with an overlap of images acquired by the first device 83, 84. The robot arm 6 then carries out, secondly, a second capture of images at the points at which a singularity has been detected. When a first trajectory 30 is carried out to guide the robot arm 6 on a portion selected by an operator and when a set of images acquired by the first optical device is realised, the robot arm 6 engages a second trajectory 31. This trajectory may be automatically generated from the singular points identified during the course of the first trajectory 30. In order to collect a second series of images at identified points, the second device 85 is activated automatically at points characteristic of the second trajectory 31.

Laser Application

According to another case of application, the robot arm 6 comprises a laser transmitter at its distal end. The laser transmitter may be, for example, arranged on the distal part of the operator device 8. The latter may be used for epilation, the treatment of certain skin ailments or for tattoo removal. Further, an Ultherapy treatment or any medical or aesthetic dermatological treatment having recourse to a laser may be implemented with a robot arm comprising a laser source. To this end, the configuration of the laser source may be adapted according to the use as a function of parameters of power, wavelength, pulsed or continuous regime, etc.

In the case of the management of a laser source, a meshing $M_2$ may advantageously be used to optimise the configuration of the laser shot notably to manage the shot power. Indeed, a homogeneous meshing, comprising for example equilateral triangles, makes it possible to define a meshing of circles circumscribed on said triangles or inscribed in said triangles. An advantage of a circular meshing circumscribed on said triangles is to define an overlap between the circles and thus between the shots. This configuration makes it possible to define shot target zones adjacent to a considered target zone. An interest of the construction of tangent circles directly derived from a homogeneous meshing is to generate a target laser shot zone while making it possible to manage a parameter of amount of homogeneous overlap between two consecutive shots on neighbouring targets.

The invention makes it possible to manage the amount of overlap so as to compensate the inhomogeneity of the amount of energy of a laser beam around the principal shot axis. Thus, it becomes possible to deposit a substantially homogeneous amount of energy on a given zone with a homogeneous type meshing.

In the case of a plurality of laser transmissions to carry out with a view to accomplishing an objective of treatment of a zone of the skin, the guiding of the robot arm 6 may be configured to become immobilised at a set of points to carry out successive shots according to a given trajectory planning. The trajectory planning PLAN_TRAJ is determined by means of a user interface UI. The trajectory of the robot arm 6 may be adapted in real time to take into account, for example, data linked to the configuration of the laser source, a movement of the patient or instead the detection of a collision of the arm.

The system of the invention comprises a means for defining the parameters of laser shots, namely a shot power and/or a diameter to reach on the surface of the skin as well as an amount of overlap. The laser transmitter and the guiding trajectory may be configured to attain these objectives.

According to an embodiment, the resolution of the homogeneous meshing may be adapted according to a given shot configuration. Typically, when a surface of a laser shot is defined with a maximum radius to attain on the surface of the skin, the meshing is configured to define circles of which the dimensions correspond with the shot constraint.

In each of the applications, during guiding in real time, the robot arm 6 which covers a given trajectory is made to evaluate the trajectory in real time. This evaluation is carried out by means of a calculator and the implementation of the method of the invention.

When the body does not move, the images of the surface of the body recalculated in order to position the robot arm 6 only involve rotations of an already calculated surface, that is to say that the transformation is isometric and corresponds to one or more rotations of the robot arm according to the portion of trajectory covered. The generated position of the surface of the body is generated for a position of the head of the robot arm.

When the body moves, the images of the surface of the body recalculated in order to position the robot arm 6 involve a non-isometric transformation, the surface is recalculated from the method of the invention. Apart from potential rotations to take into account, the method of the invention makes it possible to carry out a regression on the shape descriptors and to regenerate a surface of the body at the viewpoint of the position of the head of the robot arm.

According to an embodiment, notably within the context of an arrangement of a transmitter on the head 8 of the robot arm 6, of laser or ultrasonic type, when a region of interest is less than a given surface threshold, a step of optimisation of the meshing of the surface of interest may be implemented. This optimisation may be carried out in order that the transformation in this region is considered as isometric. According to an exemplary embodiment, the method of the invention makes it possible to determine key points on the considered surface of the body in order to delimit a region of interest having undergone a shape transformation that is isometric.

An advantage of the invention is to be able to be adapted to dermatological, surgical, cardiological applications, etc.

The invention claimed is:
1. A method for generating a three-dimensional working surface of a human body, the method comprising:
receiving input data corresponding to geometric data;
generating a first point cloud from the input data, each point being associated with a three-dimensional spatial coordinate;
determining a set of at least one attribute at each point of the first point cloud;
associating said sets of at least one attribute to the points of the first point cloud to generate a second enriched point cloud;
calculating a set of geometric parameters comprising at least one rotation at at least one point of the second enriched point cloud or at at least one articulation and at least one shape coefficient by means of a regression, said regression being carried out from a series of matrix operations performed according to different layers of a neural network,
wherein entry parameters of the neural network comprise the three dimensional spatial coordinates and the sets of at least one attribute associated with the points of the second enriched point cloud,
the neural network being trained from a plurality of partial views of parameterised body models corresponding to a parametric body model parameterised with different parameterisation configurations, each one of the parameterised body models being defined by a third point cloud so that the parameterised body models are defined by third point clouds; and determining another parameterised body model from the set of geometric parameters to generate a body model comprising a first meshing, wherein the parametric body model models the human body in which a set of articulations are predefined, each parameterisation configuration being defined by a set of modelling parameters comprising at least one first angle of rotation of each articulation of the set of articulations and at least one first shape coefficient, and wherein each partial view of the plurality of partial views is generated from a subset of points of one of the third point clouds.

2. The method according to claim 1, further comprising processing the first meshing to generate a second homogeneous meshing.

3. The method according to claim 1, comprising calculating a shape descriptor from an adjacency matrix of a connected graph of the points of the first point cloud by a method for spectral partitioning the first point cloud.

4. The method according to claim 1, wherein the set of at least one attribute at each point of the first point cloud comprises at least one shape descriptor that is a Wave Kernel Signature or Heat Kernel Signature or Gaussian Curvature.

5. The method according to claim 1, wherein the set of at least one attribute at each point of the first point cloud comprises a normal vector, the method further comprising calculating the normal vector by considering a surface generated locally around each considered point from points in its vicinity.

6. The method according to claim 5, wherein the surface generated locally at a considered point of the first point cloud is calculated:
   either, from the under-lying surface defined by the points of the first point cloud;
   or, from an approximation of a local surface directly obtained from a method of the k nearest neighbours of the considered point.

7. The method according to claim 1, wherein the set of at least one attribute at each point of the first point cloud comprises at least two shape descriptors.

8. The method according to claim 1, wherein the first point cloud is generated from data obtained:
   by acquisition of a plurality of images from at least two optics, each position of a point of the first point cloud being deduced from a stereoscopic measurement of at least two acquired images and/or;
   by acquisition of an image comprising a deformed pattern, said deformed pattern being projected by a projector and comprising a known geometry and/or;
   by acquisition of ultrasonic signals transmitted and reflected on the surface of the skin of a patient and/or;
   by acquisition of a laser transmitted on the surface of the skin of a patient.

9. The method according to claim 1, wherein said parameters further model:
   at least one global translation of the model in space, and/or
   at least one global rotation of the model in space.

10. The method according to claim 1, wherein each subset of points of the one the third point clouds is obtained by a selection of points seen from a given viewpoint of space, the partial views being generated for a plurality of viewpoints of space.

11. The method according to claim 1, wherein the regression comprises:
   neural network convolutions or layers comprising a plurality of multiplications of matrices comprising weighting coefficients obtained from a learning method; and
   non-linear operations.

12. The method according to claim 1, further comprising a preliminary step of learning of the neural network, said preliminary step being carried out by a deep learning method comprising:
   a training performed from the plurality of partial views, and
   production of matrices comprising weighting coefficients for each layer of the trained network.

13. The method as claimed in claim 1, wherein the at least one attribute comprises at least one shape descriptor.

14. The method according to claim 1, further comprising generating a plurality of first partial views of the plurality of partial views from said one of the third point clouds.

15. A system comprising an interface for acquiring input data, a calculator and a memory for processing input data acquired by means of the method of claim 1, to generate the body model.

16. A system comprising a means for acquiring distance data of a set of points of a surface of a body situated in space,
   a guided robot arm comprising at least one degree of freedom, said robot arm further comprising a sensor or a transmitter of which a position is enslaved by a guiding trajectory obtained from a treatment trajectory defined at the surface of a partial view of the body model generated from the method of claim 1.

* * * * *